US012579520B2

(12) United States Patent
Shetty

(10) Patent No.: US 12,579,520 B2
(45) Date of Patent: Mar. 17, 2026

(54) AUTOMATED ACTIONS BASED UPON EVENT CONTENT IN A CONFERENCING SERVICE

(71) Applicant: Omnissa, LLC, Mountain View, CA (US)

(72) Inventor: Rohit Pradeep Shetty, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 63 days.

(21) Appl. No.: 18/607,377

(22) Filed: Mar. 15, 2024

(65) Prior Publication Data

US 2025/0124412 A1     Apr. 17, 2025

(30) Foreign Application Priority Data

Oct. 11, 2023    (IN) .............................. 202341068290

(51) Int. Cl.
| | |
|---|---|
| *G06Q 10/00* | (2023.01) |
| *G06F 40/00* | (2020.01) |
| *G06F 40/295* | (2020.01) |
| *G06Q 10/1093* | (2023.01) |

(52) U.S. Cl.
CPC ....... *G06Q 10/1093* (2013.01); *G06F 40/295* (2020.01)

(58) Field of Classification Search
CPC .............................. G06Q 10/00; G06Q 50/00
USPC .......................................................... 705/7.19
See application file for complete search history.

(56) References Cited

U.S. PATENT DOCUMENTS

| | | | | |
|---|---|---|---|---|
| 7,822,621 B1 * | 10/2010 | Chappel | ................. | G06Q 10/10 |
| | | | | 706/45 |
| 2016/0314438 A1 * | 10/2016 | Berndtsson | ............. | H04L 51/08 |
| 2022/0309440 A1 * | 9/2022 | Nagrath | ......... | G06Q 10/063114 |
| 2022/0327494 A1 * | 10/2022 | Deole | ................. | H04L 12/1818 |
| 2023/0385825 A1 * | 11/2023 | Dongare | .............. | G06F 40/284 |
| 2024/0202636 A1 * | 6/2024 | Daga | ................... | H04L 12/1818 |

* cited by examiner

*Primary Examiner* — Mustafa Iqbal
(74) *Attorney, Agent, or Firm* — Kim & Stewart LLP

(57) ABSTRACT

Disclosed are various approaches for detecting whether an event in a conferencing service is advanced or delayed relative to an agenda providing by the conferencing service or an event organizer. A speech-to-text conversion of the audio component can be performed and compared against the agenda. Segments of interest can be identified and users notified if the event is advanced or delayed.

14 Claims, 3 Drawing Sheets

120

AUTOMATED ACTIONS BASED UPON EVENT CONTENT IN A CONFERENCING SERVICE

CROSS-REFERENCES

This application claims the benefit of Indian Patent Application number 202341068290, entitled "AUTOMATED ACTIONS BASED UPON EVENT CONTENT IN A CONFERENCING SERVICE," filed on Oct. 11, 2023, of which is hereby incorporated by reference in its entirety.

BACKGROUND

In an enterprise setting, individuals can collaborate using conferencing applications and services. In some meetings conducted in a conferencing service, certain portion of an event might be of interest to certain users but not others. Additionally, another portion of an event may be of interest to a different subset of users. Some users may join a meeting late and require information about a portion of the meeting that the user missed.

However, users might not be aware of which portion of the event is relevant to their interests or needs in advance, potentially requiring the user to attend more of an event than is necessary, wasting time in which the user could have devoted to other tasks. In some cases, an event may publish an agenda ahead of time, but oftentimes, the event does not strictly adhere to the agenda and certain portions of the event might start early or late, causing the user to miss a segment in which the user was interested. Or, if the event is running behind schedule, the user might join the event and spend time in a portion of the event that is of no interest or relevance to the user. Accordingly, existing conferencing systems lack certain usability aspects that can make them more useful to users.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to identifying portions of an event that are relevant to user's interests in a conferencing service. Examples of the disclosure can also alert user if an event to which they are invited is progressing according to an agenda so that the user can attend portions of the meeting that match the interests or requirements of the user. Examples of the disclosure can improve the functionality of existing conferencing services or add features to conferencing services that lack certain usability options. Some conferencing services can allow for many users to attend a particular event, such as a teleconference or a videoconference. However, events that are curated by organizers often behind schedule or even ahead of schedule. As a result, users who attend events in a conference service may find themselves attending portions of the event in which they are uninterested or unneeded.

For example, a meeting might only loosely adhere to a published or provided agenda, which causes portion of the event to run ahead of schedule or behind schedule. If a portion of an event in which a user is interested is running ahead of schedule, examples of the disclosure can generate a notification that is sent to a device of the user to notify the user to join the event. Similarly, if a portion of an event in which a user is interested is running behind schedule, examples of the disclosure can notify the user that the event is running behind schedule and that the user can delay joining the event.

Finally, in some situations, an attendee may join an event late or must step out of the event for a period of time during an ongoing event. In these situations, the user is left to play catch-up or request that the ongoing discussion be paused to bring the user up-to-speed. Accordingly, examples of the disclosure can generate a recap of the event for the period of time where the user was absent and present the recap or summary to the attendee to minimize disruption to other users.

Figure 1:
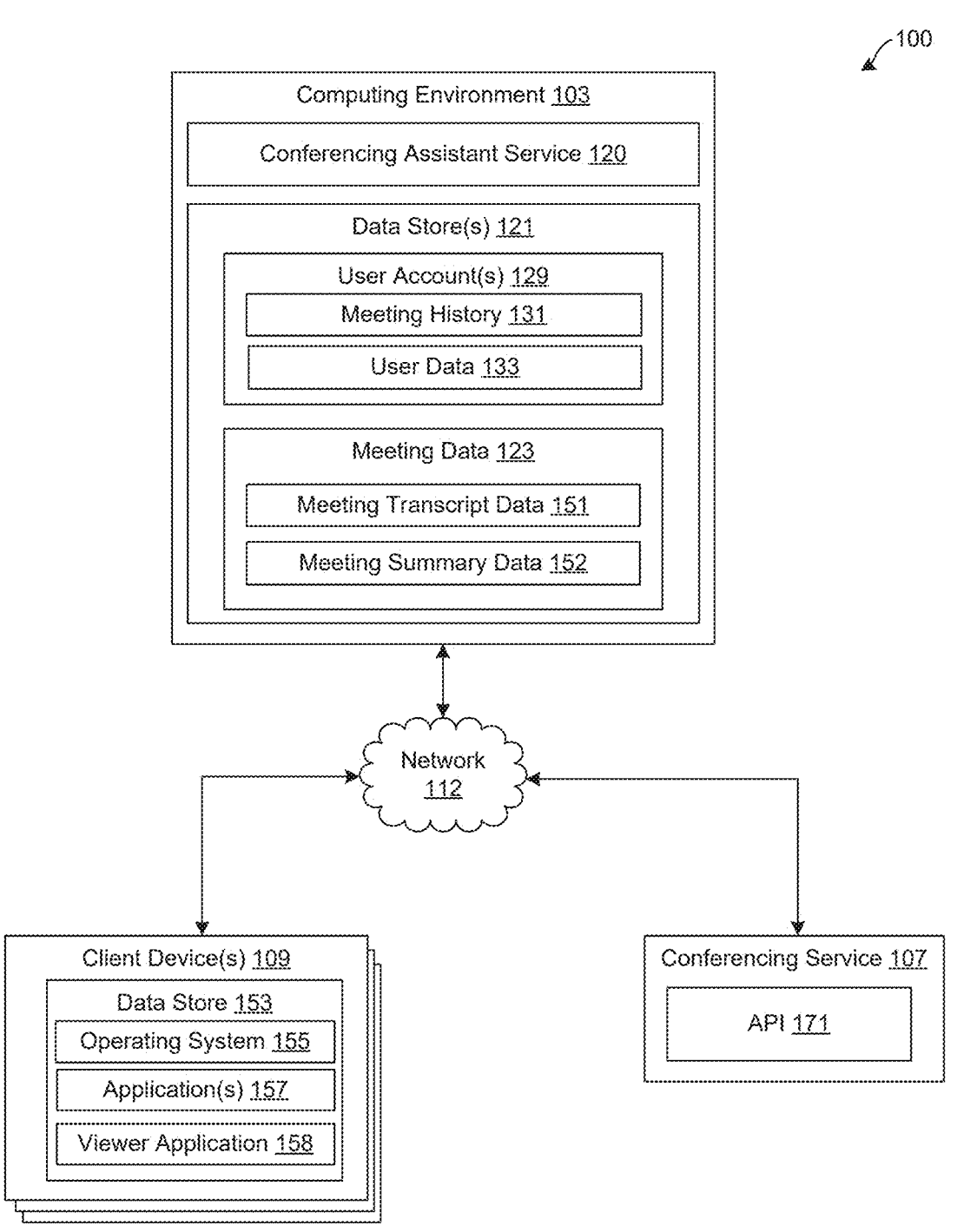
FIG. 1 is a drawing of an example of a networked environment, including client devices, network services, an identity manager service, a workflow service, and other components in communication through a network.

With reference to FIG. 1, shown is an example of a networked environment 100. The networked environment 100 can include a computing environment 103, conferencing service 107, and a client device 109 in communication through a network 112.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 112 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can include a server computer or any other system providing computing capability. While referred to in the singular, the computing environment 103 can include a plurality of computing devices that are arranged in one or more server banks, computer banks, or other arrangements. The computing devices of the computing environment 103 can be located in a single installation or can be distributed among many different geographical locations local and/or remote from the other components. The computing environment 103 can include a grid computing resource or any other distributed computing arrangement. The computing environment 103 can also include or be operated as one or more virtualized computer instances. For purposes of convenience, the computing environment 103 is referred to herein in the singular. The components executed on the computing environment 103 can include a conferencing assistant service 120 as well as other applications, services, processes, systems, engines, or functionality not discussed in detail herein.

The conferencing assistant service 120 can operate remotely from a client device 109 associated with an event attendee. The conferencing assistant service 120 can perform actions on behalf of users or attendees of an event in a conferencing service 107. The conferencing assistant service 120 can join events held within the conferencing service 107 and detect when a segment of interest in the event is about to occur. The conferencing assistant service 120 can generate an alert that can be provided to a client device 109 of a user to inform the user that the segment of interest is about to occur or that the segment of interest is delayed within the event.

The conferencing assistant service 120 can make such a determination based upon an analysis of an agenda that is provided or published about the event as well as based upon a speech-to-text conversion of an audio component of the event that is obtained from the conferencing service 107. The conferencing assistant service 120 can obtain an audio component of the event by joining the conferencing service 107 as a participant on behalf of one or more users utilizing the conferencing assistant service 120 or through an API provided by the conferencing service 107 through which the audio component of the event is accessible.

Additionally, the conferencing assistant service 120 can provide an event summary generated from an event or from portions of an event in the conferencing service 107. A user can indicate a segment of interest when accepting an invitation to the event, and the conferencing assistant service 120 can generate a summary or a transcript of the event in which the user indicated an interest.

The conferencing assistant service 120 can work in conjunction with a conferencing service 107. The conferencing assistant service 120 can utilize an API 171, or an application programming interface, that is provided by the conferencing service 107. The API 171 can allow for programmatic interactions with the conferencing service 107 and events hosted by the conferencing service 107. In some implementations, the functionality of the conferencing assistant service 120 can be included within the conferencing service 107.

The conferencing assistant service 120 can provide a machine learning service layer and an assistant service layer. The machine learning service layer can provide one or more machine learning service layers that can perform various tasks such as natural language processing, distraction detection, generating meeting recaps and summaries, suggesting breakout rooms assignments, and other tasks as discussed herein. The assistant service layer can create an assistant or bot that can be added to each event that utilizes the conferencing assistant service 120. The assistant can be added to an event as a participant or as an event administrator so that it can interact with the attendees of the event, create breakout rooms, and perform other tasks as discussed herein. Although described above has having two service layers, the conferencing assistant service 120 need not be implemented using a dual service layer architecture. More or fewer service layers can be utilized in its implementation.

The data store 121 can include any storage device or medium that can contain, store, or maintain the instructions, logic, or applications described herein for use by or in connection with the computing environment 103. The data store 121 can be a hard drive or disk of a host, server computer, or any other system providing storage capability. While referred to in the singular, the data store 121 can include a plurality of storage devices that are arranged in one or more hosts, server banks, computer banks, or other arrangements. The data store 121 can include any one of many physical media, such as magnetic, optical, or semi-conductor media. More specific examples include solid-state drives or flash memory. The data store 121 can store user information, such as user primary language, past break-rooms created within the conferencing service 107, a past meeting history, and other history or usage data. The data store 121 can be used to abstract away output of a machine learning process that is performed in conjunction with other services. A bot/assistant or a machine learning process that utilize the data store 121 for obtaining relevant information about users and previous meetings.

The data store 121 can include memory of the computing environment 103, mass storage resources of the computing environment 103, or any other storage resources on which data can be stored by the computing environment 103. The data stored in the data store 121 can include, for example, meeting data 123, user accounts 129, and other data that is not depicted and not necessary for a full understanding of examples of the disclosure.

The user accounts 129 can be associated with users of an enterprise. The user accounts 129 can be associated with a directory service that can facilitate user management. The user accounts 129 be associated with authentication data, single sign-on tokens, service records, local connectors, and external connectors. Other information about the user can also be stored as part of the user account 129, such as the user's name, email address, contact information, enterprise responsibilities, and client devices 109. User accounts 129 can also be associated with a meeting history 131. A meeting history 131 represents a history of events hosted by the conferencing service 107 that a particular user has attended. In some cases, the meeting history 131 can represent a history of events hosted by the conferencing service 107 to which the user has been invited, regardless of whether the user has attended the event. The meeting history 131 can be utilized by the conferencing assistant service 120 to determine whether a meeting recap or summary for a subsequent event should be generated in response to the same group of users attending the subsequent event, such as in the case of a recurring meeting. The meeting history 131 can also be utilized to determine potential segments of interest to a particular user for a subsequent event occurring within the conferencing service 107.

The user account 129 can also include user data 133, which can include other information about the user. The user data 133 can include a group within an enterprise to which the user belongs. The user data 133 can also identify a role within a group or enterprise, an email address, job title, primary language of the user, and other data. The user data 133 can also be utilized to determine whether to assign the user to a breakout room within the conferencing service 107 with other users who are attended an event hosted by the conferencing service 107. The user data 133 can also include device data for associated client devices 109 assigned to the user. Device data can include one or more of a device identifier, a unique device identifier (UDID), a media access control (MAC) address, an internet protocol (IP) address, or another identifier that uniquely identifies a device with respect to other devices. The device data can include device specifications, and a type of each client device 109. Specifications for the client device 109 can include a hardware configuration that specifies a chipset identifier, a video card identifier, a memory identifier, a monitor or screen identifier, an input device identifier, and a peripheral identifier for each peripheral utilized by the client device 109. Specifications for the client device 109 can include a software configuration that specifies an application identifier for each application installed on the client device 109, a driver or driver version for hardware device and peripheral of the client device 109, an operating system or operating system version installed on the client device 109, and other information.

Meeting data 123 represents information about previous meetings hosted by the conferencing service 107. The meeting data 123 can be obtained by the conferencing assistant service 120 from the conferencing service 107 and archived in the data store 121. The meeting data 123 can include a meeting agenda that can be provided or published by a meeting organizer. The meeting agenda can comprise a document that identifies the topics or agenda of the event that is hosted within the conferencing service 107.

The meeting data 123 can include meeting transcript data 151 and meeting summary data 152. Meeting transcript data 151 can include transcripts of previous events hosted by the conferencing service 107 that were also managed or attended by the conferencing assistant service 120. The transcripts can be text transcripts of the discussion based on a natural language processing (NLP) analysis of the discussion of the event or a speech-to-text conversion of an audio component or recording of the event. The transcripts can be generated by the conferencing assistant service 120 or obtained from the conferencing service 107 using the API 171. In some instances, a conferencing service 107 can record and/or generate a transcript of an event hosted by the conferencing service 107.

In some examples, meeting transcript data 151 can include a recording of an audio component or a video component of an event. The recording can be captured by the conferencing assistant service 120 as an attendee of the event or captured by the conferencing service 107 can retrieved from the conferencing service 107 using the API 171. The meeting transcript data 151 can also include timecode tags that tag a particular portion of the transcript with a topic identified by the conferencing assistant service 120.

Summary data 152 can comprise event summaries or event recaps that are generated by the conferencing assistant service 120 from a previous event. An event summary can comprise a summary generated from an event transcript that can be provided to users after conclusion of the event or at the start of a subsequent event, such as an event that has the same attendees as a previous event. An event summary can be generated using a natural language processing process that can generate a summary from a text transcript or from an audio and/or video recording of the event. The text transcript can summarize the content of the event and content shared between attendees of the event hosted by the conferencing service 107.

The conferencing service 107 can be a third-party service or a service that is hosted within the computing environment 103. The conferencing service 107 represents a service in which users can conduct video or audio conferences. Users can join conferences using a client application on a client device 109, by dialing in from a phone, or using a browser-based client. The conferencing service 107 can provide an audio component and/or a video component corresponding to an event to the conferencing assistant service 120. The conferencing service 107 can also provide an API 171 through which the conferencing assistant service 120 can interact with events hosted using the conferencing service 107 and with users or attendees of those events.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, a voice activated smart device, or any other device with like capability. The client device 109 can have an operating system that can perform functionalities and execute applications. The operating system 155 can be stored in a data store 153 that also includes applications 157, a viewer application 158 and other data.

Some applications 157 can include a browser or a dedicated application, and a user interface can include a network page, an application screen, or other interface. The client device 109 can also access web applications using the browser application. Further, other applications 157 can include device management applications, enterprise applications, social networking applications, word processors, spreadsheet applications, media player applications, or other applications.

A viewer application 158 represents an application that is utilized to access events or content from the conferencing service 107. The viewer application 158 can be a client application through which the user can join events, view video from other users who have joined the event, listen to audio shared during the event, and consume or share other content, such as documents, screen-sharing and other features that are utilized in a conferencing service 107. In some examples, the viewer application 158 can receive video and/or audio from the conferencing service 107 and render the content on the client device 109.

A user can create an event within the conferencing service 107 using the viewer application 158 or another user interface provided by the conferencing service 107. In some examples, the user can create an event using an email or calendar client that can communicate with the API 171 to create an event within the conferencing service 107.

The creator or originator of the event can invite other attendees by creating a meeting invitation using an email or calendar client. Alternatively, attendees can be invited using the viewer application 158. The conferencing assistant service 120 can be configured by an enterprise to monitor events created by its users within the conferencing service 107 or on a calendar that include a link to an event within the conferencing assistant service 120. The conferencing assistant service 120 can create an assistant or bot instance that joins the event within the conferencing service 107 along with the other attendees. The assistant can be joined to the event as an administrator so that the conferencing assistant service 120 can create breakout rooms, mute participants of the event, and take other actions as an event administrator.

The creator or originator of the event can also include a meeting agenda, which can be a document that outlines an agenda of the event. The meeting agenda can identify particular times within the event at which certain topics are scheduled. In some cases, the meeting agenda might only provide an overview of the entire event without providing scheduled times at which certain topics or events within an overall event are scheduled to occur.

In examples of this disclosure, the conferencing assistant service 120 can provide an assistant or bot that can join events in the conferencing service 107 as a co-host, allowing attendees to interact with the bot for certain tasks. The conferencing assistant service 120 can generate an assistant or bot instance as a participant in the conferencing service 107 using the API 171. Accordingly, the conferencing assistant service 120 can have access to information that other attendees have, including both the audio and video components of the event. Using machine learning for processing, the conferencing assistant service 120 can analyze the conversation in real time and take actions based on what is happening in the event audio and video components.

However, as noted above, some meetings or events may not proceed according to a published or provided agenda or schedule. Accordingly, examples of the disclosure can allow a user to enlist the services of the conferencing assistant service 120 to notify the user when segments of interest in the event are occurring or about to occur. Additionally, the conferencing assistant service 120 can also perform the role of a note-keeper or monitor by processing the audio or video component of the event on an ongoing basis. The conferencing assistant service 120 can generate a meeting transcript by performing a speech-to-text conversion of the audio component of the event and determine whether the event is proceeding as per the timelines set forth in the meeting agenda provided by the meeting organizer. The meeting agenda can be obtained by the conferencing assistant service 120 from a user's calendar when the user accepts an invitation to the event or directly from the conferencing service 107 if the meeting agenda is published as an asset associated with the event.

When any discrepancy from the meeting agenda is detected by the conferencing assistant service 120, the conferencing assistant service 120 can alert a user who has enlisted the services of the conferencing assistant service 120. In one example, a user can indicate an interest in particular segments of interest in a meeting agenda in a user interface presented to the user. The conferencing assistant service 120 can identify those segments of interest in the event based upon the meeting transcript that can be generated in real-time from the audio component of the event.

If the event is behind schedule, or if the segments of interest to a user will occur later than expected, the conferencing assistant service 120 can generate a notification that is transmitted to a device of the user informing the user of the same. If the event is ahead of schedule, or if the segments of interest to a user will occur earlier than expected, the conferencing assistant service 120 can generate a notification that is transmitted to a device of the user informing the user of the same.

In another example, the user can indicate interest in particular topics or keywords, and the conferencing assistant service 120 can automatically determine segments of interest to the user based upon an analysis of the agenda and a syntactical analysis of meeting transcript. These topics or keywords can be transformed into tags that are assigned to a respective user by the conferencing assistant service 120.

Accordingly, users can request for conferencing assistant service 120 assistance for meetings or the conferencing assistant service 120 could be assigned by default to meetings. Once the conferencing assistant service 120 is assigned to a meeting, the conferencing assistant service 120 can make the following determinations. First, the conferencing assistant service 120 can determine the participants in meeting who have requested assistance from the conferencing assistant service 120. The conferencing assistant service 120 can also determine the meeting agenda for the meeting. The meeting agenda can be determined from the user's calendar or from the conferencing service 107 based upon a published meeting agenda for the event.

In some cases, the conferencing assistant service 120 can determine predicted segments of interest for a user based upon one or more keywords or tags that the user has previously submitted to the conferencing assistant service 120 as topics of interest to the user. In another example, the conferencing assistant service 120 can determine segments of interest based upon items in the meeting agenda that the user has explicitly identified as being of interest to the user. In one example, the items in the meeting agenda can be selected in a user interface provided to the user in a calendar application.

When an event within the conferencing service 107 commences, the conferencing assistant service 120 can join the event as a participant. The conferencing assistant service 120 can then obtain a meeting transcript from the conferencing service 107 or perform a speech-to-text conversion of an audio component of the event to generate a transcript. The transcript can then be used to generate tags at runtime using Named Entity Recognition techniques. The conferencing assistant service 120 can also obtain and analyze content shared in the meeting as a point of reference. The content can comprise files shared within the conferencing service 107 or content displayed in screen sharing feature of the conferencing service 107.

The conferencing assistant service 120, at runtime, can perform a syntactical match of the tags assigned to each user to tags that can be generated from the transcript of the event to ascertain whether the various meeting segments are proceeding in line with the time slots mentioned in the agenda. The matching performed by the conferencing assistant service 120 can be further refined based on the agenda, timing and can utilize language models for the same.

Based upon the syntactical match performed by the conferencing assistant service 120, users can also be alerted that a segment of interest is either advanced, delayed, or on schedule. The conferencing assistant service 120 can make the decision on advanced or delayed by comparing the ongoing segments against the meeting agenda of the event. Such a comparison gives a fair idea on whether a segment has been delayed or advanced. Users can accordingly then be alerted by the conferencing assistant service 120 so that they can schedule their plans accordingly. The conferencing assistant service 120 can repeatedly or recursively perform the syntactical matching and alerting steps to inform users when any segment of interest to them is delayed or advanced.

Figure 2:
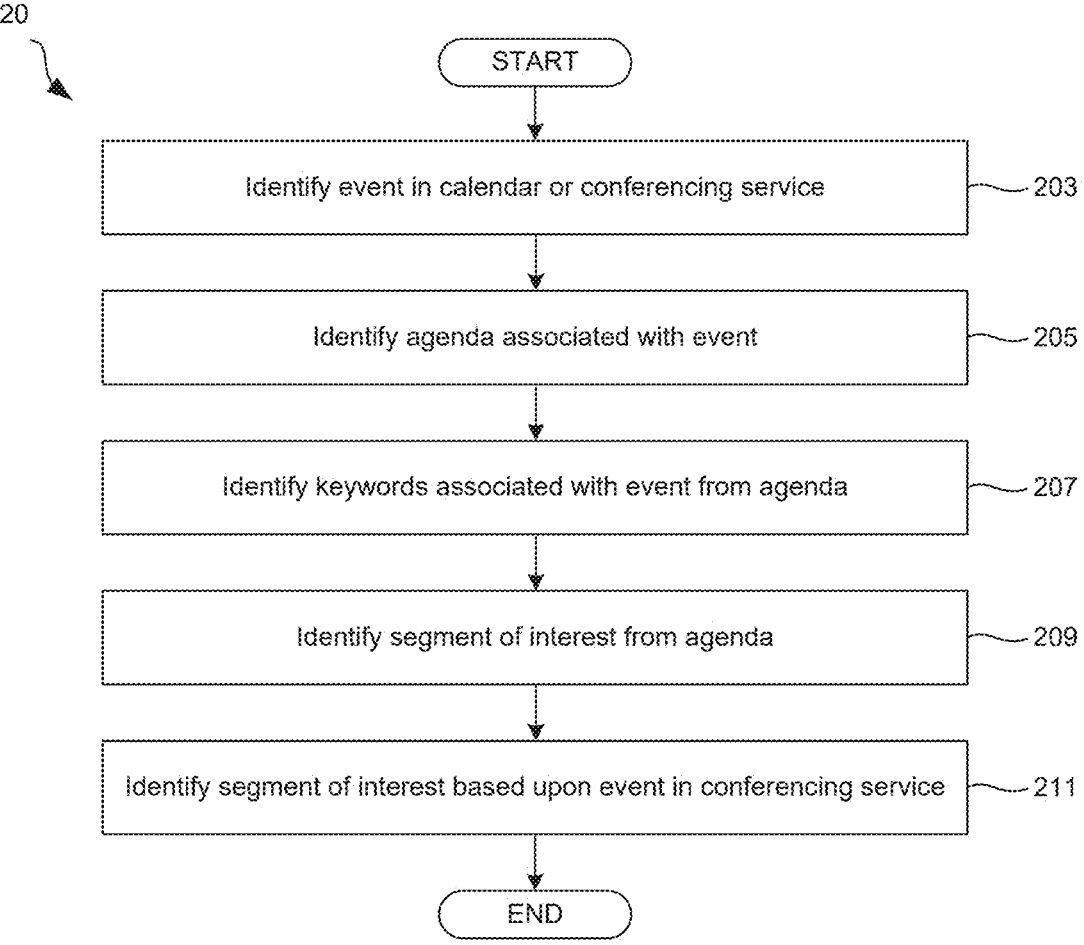
FIG. 2 is a flowchart outlining functionalities implemented by the workflow service and other components of the networked environment.

Referring next to FIG. 2, shown is a flowchart describing steps that can be performed by the components of the networked environment 100, such as the conferencing assistant service 120. Generally, the flowchart describes how the conferencing assistant service 120 can identify an event in a conferencing service and identify segments of interest that are associated with users who are invited to or participating in the event within the conferencing assistant service 120.

First, at step 203, the conferencing assistant service 120 can identify an event in a user's calendar or within the conferencing service 107 that is associated with a particular enterprise or account for which the conferencing assistant service 120 is enabled. In some examples, the conferencing assistant service 120 can be a feature of the conferencing service 107. In other examples, the conferencing assistant service 120 can create an instance of an assistant or a bot that can join the event within the conferencing service 107 as an event participant so that the conferencing assistant service 120 can obtain a meeting agenda from the user's calendar or from the conferencing service 107. In some cases, the conferencing assistant service 120 can join the event as a meeting participant on behalf of one or more users requesting alerts for segments of interest within the event.

At step 205, the conferencing assistant service 120 can identify a meeting agenda associated with the event. In one example, the meeting agenda can be identified from a calendar invitation in a calendar or email system. The meeting agenda can be a document and outlines the agenda or schedule of an event. The schedule can identify one more topic areas that will be addressed or covered in the event. The conferencing assistant service 120 can identify the agenda in some cases by retrieving the agenda from the conferencing service 107, which can publish the agenda in certain scenarios.

At step 207, the conferencing assistant service 120 can identify keywords in the agenda for the event. The keywords identified in the agenda can be utilized to determine segments of interest in which a user might be interested. In some cases, timecodes can also be identified by the conferencing assistant service 120 in the agenda if the agenda outlines a specific schedule for topic areas or keywords.

At step 209, the conferencing assistant service 120 can identify one or more segments of interest in the agenda. The segments of interest can comprise a segment in the agenda that is described by one or more keywords that might be related to keywords provided or identified by one or more users utilizing the conferencing assistant service 120 to receive alerts about the event.

At step 211, the conferencing assistant service 120 can attend the event within the conferencing service 107. The conferencing assistant service 120 can perform a speech-to-text conversion of an audio component of the event from users who are speaking in the event. The speech-to-text conversion or transcript can be analyzed utilizing a language model or a natural language processing model to identify one more syntactical tags in the event.

Thereafter, the process can proceed to completion.

Figure 3:
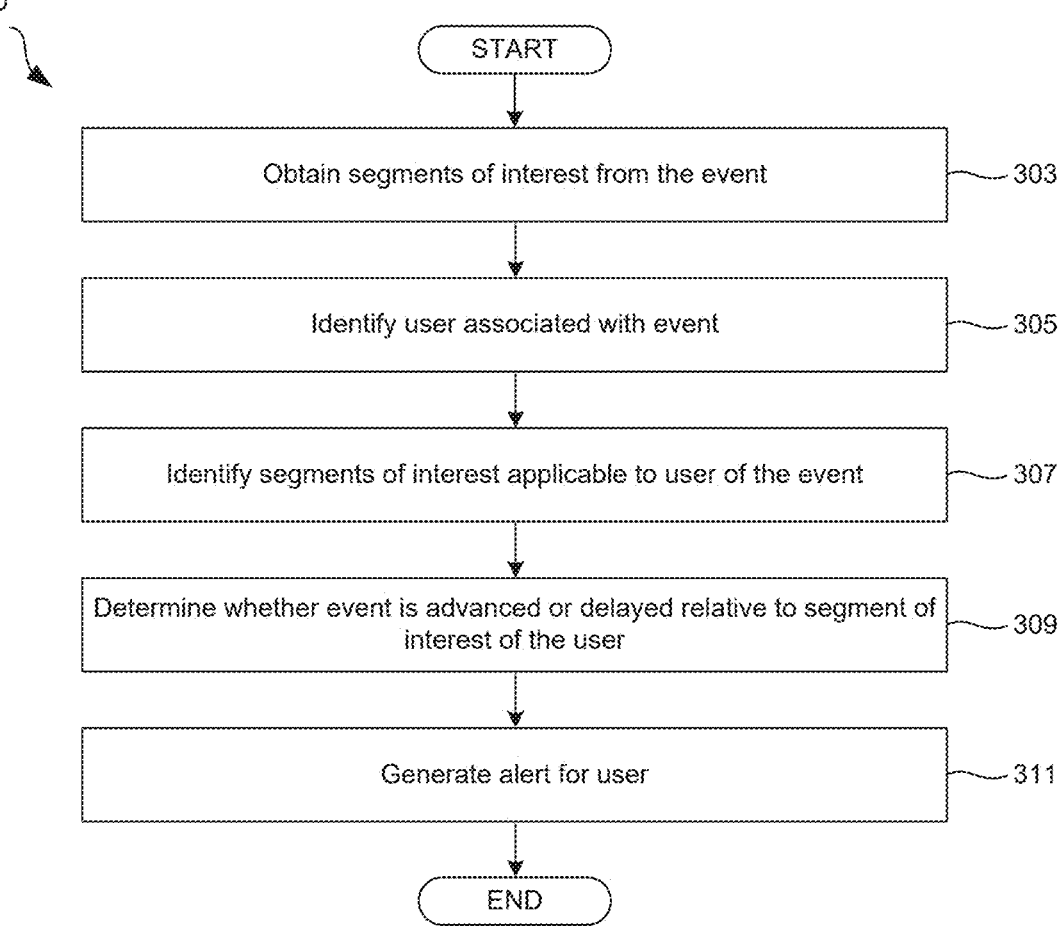
FIG. 3 is another flowchart outlining functionalities implemented by the workflow service and other components of the networked environment.

Referring next to FIG. 3, shown is a flowchart describing steps that can be performed by the components of the networked environment 100, such as the conferencing assistant service 120. Generally, the flowchart describes how the conferencing assistant service 120 can generate alerts for users based upon segments of interest that are identified in an event in the conferencing assistant service 120.

First, at step 303, the conferencing assistant service 120 can obtain segments of interest that are identified by the conferencing assistant service 120 according to various examples. At step 305, the conferencing assistant service 120 can identify a user associated with the event that has enlisted the functionality of the conferencing assistant service 120 to generate alerts or notification regarding whether the event is accelerated or delayed.

At step 307, the conferencing assistant service 120 can identify segments of interest that are of interest to a user. In one example, a user can indicate an interest in particular segments of interest in a meeting agenda in a user interface presented to the user. In another example, the user can indicate interest in particular topics or keywords, and the conferencing assistant service 120 can automatically determine segments of interest to the user based upon an analysis of the agenda and a syntactical analysis of meeting transcript. These topics or keywords can be transformed into tags that are assigned to a respective user by the conferencing assistant service 120. The conferencing assistant service 120 can identify those segments of interest in the event based upon the meeting transcript that can be generated in real-time from the audio component of the event.

At step 309, the conferencing assistant service 120 can determine whether the event is behind schedule or ahead of schedule relative to the meeting agenda. If the event is behind schedule, or if the segments of interest to a user will occur later than expected, the conferencing assistant service 120 can generate a notification that is transmitted to a device of the user informing the user of the same. If the event is ahead of schedule, or if the segments of interest to a user will occur earlier than expected, the conferencing assistant service 120 can generate a notification that is transmitted to a device of the user informing the user of the same.

At step 311, the conferencing assistant service 120 can generate a notification that can be sent to a client device 109 of the user regarding whether the event is advanced or delayed relative to the segment of interests of the user. In one example, the conferencing assistant service 120 can send a notification only to a device on which the user has joined the event or that the user is currently using.

Thereafter, the process can proceed to completion.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by an application can be rendered. In some examples, the user interface can be generated with user interface data provided by the computing environment 103. The client devices 109 can also include one or more input/output devices that can include, for example, a capacitive touchscreen or other type of touch input device, fingerprint reader, or keyboard.

Although the conferencing assistant service 120, client applications 157, and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system. The computer-readable medium can include any one of many physical media, such as magnetic, optical, or semiconductor media. Examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

The invention claimed is:

1. A system, comprising:
a computing device comprising at least one processor and at least one memory; and machine-readable instructions stored in the at least one memory, wherein the instructions, when executed by the at least one processor, cause the computing device to at least:
identify an event in at least one of a user calendar of a user or a conferencing service, the event having a plurality of attendees;
generate a bot instance configured to join the event as a participant on behalf of the user by accessing one or more application programming interfaces (APIs) of the conferencing service, wherein the bot instance records an audio component and a video component of the event;
identify an agenda associated with the event based upon the user calendar;
determine a plurality of time segments and a plurality of keywords associated with the event based upon an analysis of the agenda;
identify a segment of interest associated with the user within the event based upon the analysis of the agenda;
obtain the audio component and the video component corresponding to the event recorded by the bot instance and generate a speech-to-text conversion of the audio component;
generate one or more tags utilizing Named Entity Recognition based upon the speech-to-text conversion;
associate a current time in the event with the agenda based upon the speech-to-text conversion of the audio component and the one or more tags;
determine that the segment of interest within the event is advanced or delayed based upon the association of the current time in the event with the agenda; and
generate a notification for the user associated with the segment of interest based upon the determination that the segment of interest within the event is advanced or delayed.

2. The system of claim 1, wherein the notification comprises an invitation to join the event in the conferencing service when the segment of interest is occurring.

3. The system of claim 1, wherein the user indicates the segment of interest in a user interface element when adding the event to the user calendar.

4. The system of claim 1, wherein the user indicates the segment of interest by selecting one or more keywords from the agenda.

5. The system of claim 1, wherein the machine-readable instructions further cause the at least one computing device to perform a syntactical match between the one or more tags generated and at least one of the plurality of attendees.

6. A non-transitory computer-readable medium comprising machine-readable instructions, wherein the instructions, when executed by at least one processor, cause a computing device to at least:
identify an event in at least one of a user calendar of a user or a conferencing service, the event having a plurality of attendees;
generate a bot instance configured to join the event as a participant on behalf of the user by accessing one or more application programming interfaces (APIs) of the conferencing service, wherein the bot instance records an audio component and a video component of the event;

identify an agenda associated with the event based upon the user calendar;

determine a plurality of time segments and a plurality of keywords associated with the event based upon an analysis of the agenda;

identify a segment of interest associated with the user within the event based upon the analysis of the agenda;

obtain the audio component and the video component corresponding to the event recorded by the bot instance and generate a speech-to-text conversion of the audio component;

generate one or more tags utilizing Named Entity Recognition based upon the speech-to-text conversion;

associate a current time in the event with the agenda based upon a speech-to-text conversion of the audio component and the one or more tags;

determine that the segment of interest within the event is advanced or delayed based upon the association of the current time in the event with the agenda; and generate a notification for the user associated with the segment of interest based upon the determination that the segment of interest within the event is advanced or delayed.

7. The non-transitory computer-readable medium of claim 6, wherein the notification comprises an invitation to join the event in the conferencing service when the segment of interest is occurring.

8. The non-transitory computer-readable medium of claim 6, wherein the user indicates the segment of interest in a user interface element when adding the event to the user calendar.

9. The non-transitory computer-readable medium of claim 6, wherein the user indicates the segment of interest by selecting one or more keywords from the agenda.

10. The non-transitory computer-readable medium of claim 6, wherein the machine-readable instructions further cause the at least one computing device to perform a syntactical match between the one or more tags generated and at least one of the plurality of attendees.

11. A method comprising:

identifying an event in at least one of a user calendar of a user or a conferencing service, the event having a plurality of attendees;

generating a bot instance configured to join the event as a participant on behalf of the user by accessing one or more application programming interfaces (APIs) of the conferencing service, wherein the bot instance records an audio component and a video component of the event;

identifying an agenda associated with the event based upon the user calendar;

determining a plurality of time segments and a plurality of keywords associated with the event based upon an analysis of the agenda;

identifying a segment of interest associated with the user within the event based upon the analysis of the agenda;

obtaining the audio component and the video component corresponding to the event recorded by the bot instance and generating a speech-to-text conversion of the audio component;

associating a current time in the event with the agenda based upon a speech-to-text conversion of the audio component and the one or more tags;

determining that the segment of interest within the event is advanced or delayed based upon the association of the current time in the event with the agenda; and generating a notification for the user associated with the segment of interest based upon the determination that the segment of interest within the event is advanced or delayed.

12. The method of claim 11, wherein the notification comprises an invitation to join the event in the conferencing service when the segment of interest is occurring.

13. The method of claim 11, wherein the user indicates the segment of interest in a user interface element when adding the event to the user calendar.

14. The method of claim 11, wherein the user indicates the segment of interest by selecting one or more keywords from the agenda.

* * * * *